United States Patent
Wood

[11] 3,902,068
[45] Aug. 26, 1975

[54] METHOD AND APPARATUS FOR MEASURING THE GAS TRANSMISSION THROUGH PACKAGING MATERIALS

[75] Inventor: Rex C. Wood, New Brighton, Minn.

[73] Assignee: Modern Controls, Inc., Minneapolis, Minn.

[22] Filed: Apr. 10, 1974

[21] Appl. No.: 459,668

[52] U.S. Cl. .................. 250/343; 73/40; 73/49.3
[51] Int. Cl.[2] ........................................ G01N 21/26
[58] Field of Search ...... 250/343; 73/40, 49.2, 49.3; 356/51

[56] References Cited
UNITED STATES PATENTS
3,091,114  5/1963  Webster ............................ 73/49.3
3,679,899  7/1972  Dimeff ............................. 250/343

Primary Examiner—Davis L. Willis
Attorney, Agent, or Firm—Stuart R. Peterson

[57] ABSTRACT

The material to be tested is clamped between the two halves of a diffusion cell so as to provide first and second cavities to either side of the material. A test gas is introduced into the first cavity, the selected gas being capable of absorbing radiant energy at a known wavelength. Any of the gas passing from the first cavity through the material into the second cavity is indicative of the permeability of the material being tested. If none of the gas leaks through, then the material is virtually impervious to gas transmission; if there is leakage, the amount of gas collected in the second cavity is representative of the degree of porosity of the material.

A beam of infrared energy is directed through the absorption cell and exits via an interference filter having the capability of passing a relatively narrow band of radiant energy, the center of the band being generally at the known wavelength of the test gas. The beam after passing through the filter impinges upon a photocell. Owing to the modulated condition of the energy received by the photocell, it can be amplified with an alternating current amplifier and then rectified so as to furnish direct current to a strip-chart recorder.

18 Claims, 2 Drawing Figures

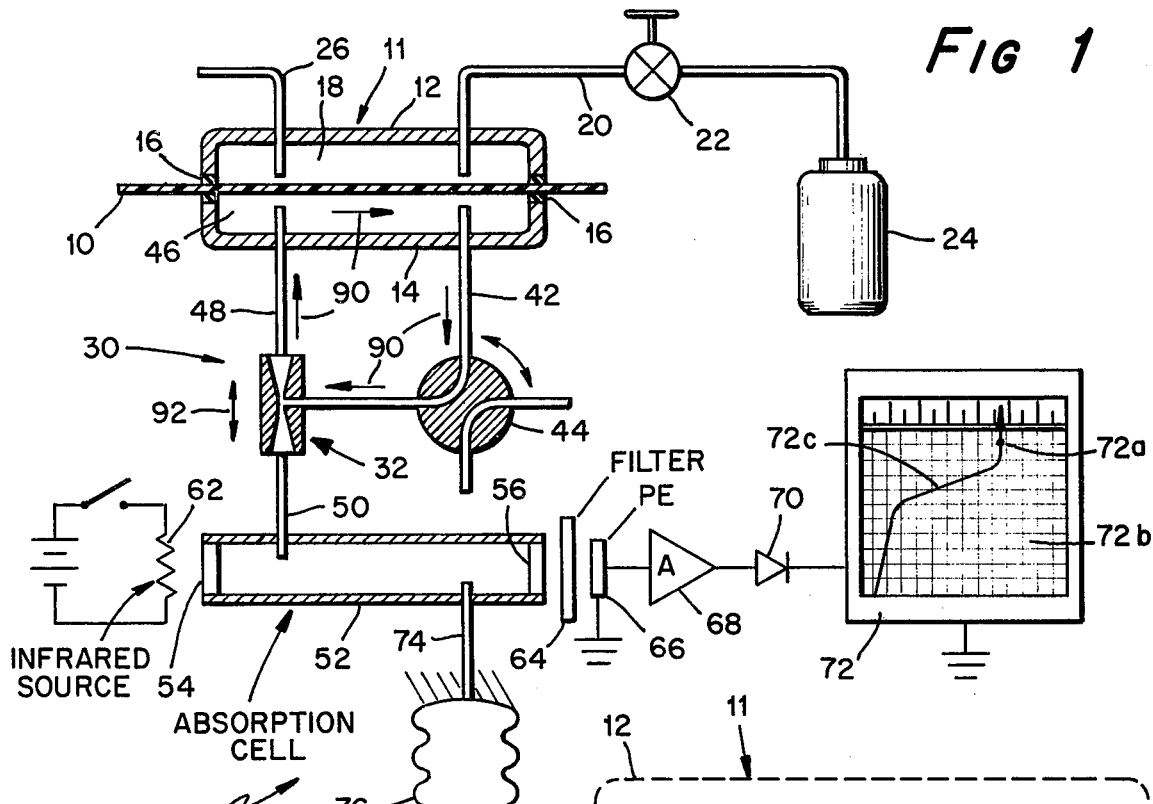
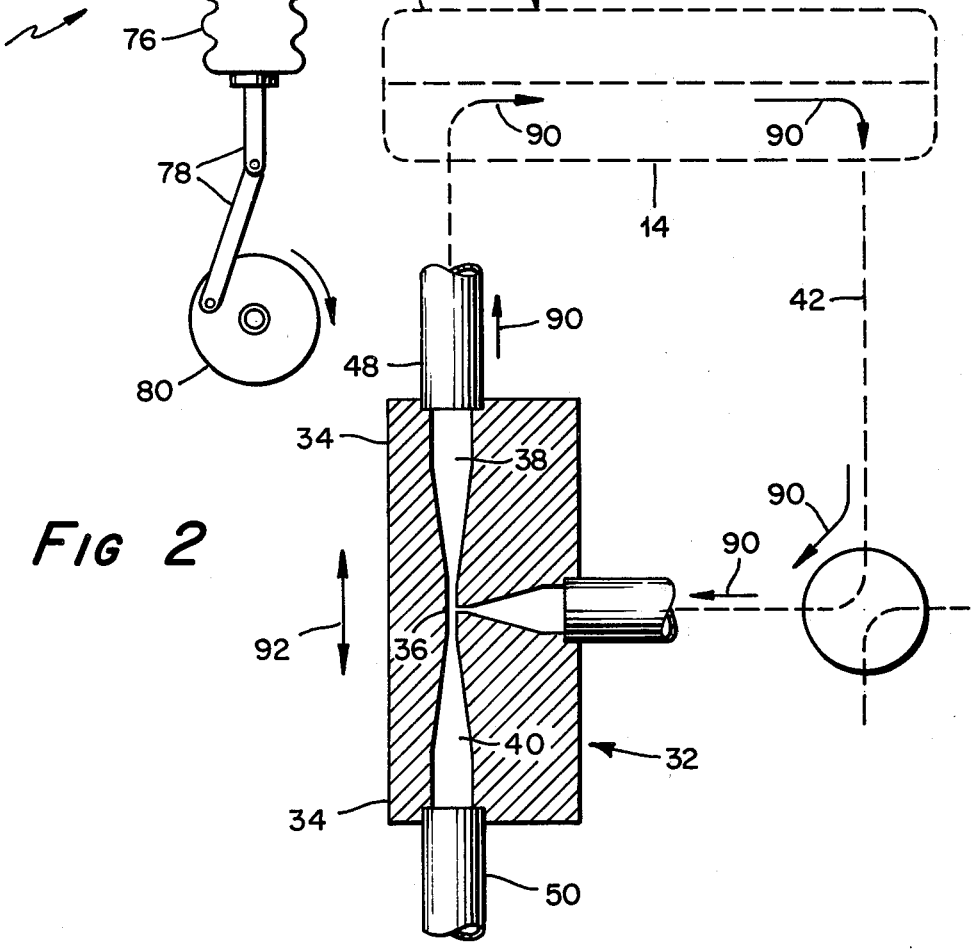

METHOD AND APPARATUS FOR MEASURING THE GAS TRANSMISSION THROUGH PACKAGING MATERIALS

BACKGROUND OF THE INVENTION

This invention relates generally to a method and apparatus for measuring the gas or vapor transmission through various packaging materials, and pertains more particularly to a method and apparatus utilizing pressure modulated infrared absorption.

SUMMARY OF THE INVENTION

One object of the invention is to provide an exceedingly simple and effective method and apparatus for measuring the barrier properties of certain materials with respect to the transmission therethrough of various gases. More specifically, an aim of the invention is to provide a method and apparatus for testing different packaging materials, such as plastic films, coated boxboard, waxed papers and the like.

Another object of the invention is to obviate the need for any mechanical moving parts associated with the optical portion of the infrared analyzer that is utilized. In this regard, an aim of the invention is to avoid the use of such components as rotating mirrors or shutters, as frequently employed in the past.

A further object of the invention, which is in contrast with dual beam or dual wavelength spectrometers utilized heretofore, resides in the realization of no zero drift due to temperature effects, contamination, or any optical misalignment. In this regard, no modulation occurs in the absence of any absorbing constituent and therefore the output signal that is indicative or representative of the degree of permeability is not even present where there is no leakage.

Yet another object of the invention is to detect small traces of the test gas that has been transmitted through the material being checked and also to provide an indication of the amount of any such gas that has been transmitted through the material, doing so in a very accurate and precise manner.

Briefly, my invention contemplates the collection of any of the test gas that has passed from one side of the sheet material undergoing testing to the other side. This collected gas, the specific gas being selected because it has the capability of absorbing infrared energy at a known wavelength, is subjected to a pumping action so that its density is cyclically increased and decreased within the absorption cell of an infrared gas analyzer. To produce the pressure pulsations resulting in the density changes, a motor-actuated bellows is repeatedly compressed and expanded. The collected gas, assuming that some is transmitted through the sheet material being tested, is drawn through a Venturi nozzle by reason of a closed loop that enables whatever gas has been collected to be sucked into the low pressure region surrounding the throat of the Venturi nozzle. Since the test gas absorbs more infrared energy when compressed, the production of the above-alluded to pressure pulsations will provide a modulated beam since the beam energy is attenuated more during the increased compression. The modulated beam after emerging from the absorption cell is directed through an interference filter that passes only a narrow band of energy radiation centered near that of the known wavelength of the selected test gas. The energy passing through the filter impinges upon a photoelectric cell and the fluctuating or alternating current output signal is amplified, rectified and the rectified signal delivered to a strip-chart recorder. The slope of the recorded curve is representative of the transmission rate of the test gas through the material being tested.

BRIEF DESCRIPTION OF THE DRAWING

FIG. 1 is a diagrammatic representation of apparatus constituting one form my invention may assume, and FIG. 2 is an enlarged view of a portion of the Venturi circulator embodied in the apparatus of FIG. 1.

DESCRIPTION OF THE PREFERRED EMBODIMENT

With my invention, various materials may be tested as to their barrier properties or characteristics, it being within the purview of the invention to check the permeability or leakage of plastic films, coated boxboard and waxed papers, as well as other materials commonly used in the packaging of various products. In the illustrated instance, a plastic film 10 has been illustrated.

It will be observed that the plastic film 10, such as polyethylene, Mylar or Saran, is clamped in a diffusion cell 11 composed of two separable halves, there being an upper casing 12 and a lower casing 14 appearing in section in FIG. 1. The edges of the two casings which abut against the plastic film 10 have soft rubber gaskets 16 extending therearound. By means of suitable clamps, such as C-clamps (not shown), the two casing halves 12, 14 are securely clamped against the film 10.

The upper casing 12 forms a cavity or chamber 18 into which a test gas is introduced via a tube or line 20 having a metering valve 22 therein. The gas that has been selected in this instance is butane, which attenuates radiation having a wavelength of 3.4 $\mu$m. Of course, carbon dioxide might very well constitute the test gas in some instances, the attenuating wavelength of carbon dioxide being 4.3 $\mu$m. Actually, a variety of gases (or vapors) that absorb radiant energy at specific wavelengths in the infrared region of the electromagnetic spectrum can be employed. Sometimes it will be desirable to detect the passage or transmission of water vapor through a particular barrier which material would be substituted for the plastic film labeled 10. As the description progresses, it is believed that the choices available to the user when practicing my invention are in no way restricted to butane, but that other gases (and vapors) can be utilized, the particular fluid depending on the material being tested and the purpose for which the material is to be used. A storage tank 24 contains a supply of butane. A discharge tube or line 26 leading to atmosphere permits any air that might be confined in the cavity 18 to be first flushed out so that virtually pure butane is thereafter present. All that need be done is to open the valve 22 so that the test butane can flow from the tank 24 into the cavity 18 and then out through the discharge tube 26. The valve 22 is left open, thereby maintaining fluid communication between the supply tank 24 and the cavity 18, and, of course, constant contact with the upper side of the material 10.

At this time, attention is directed to what is termed a Venturi circulator denoted generally by the reference numeral 30. More specifically, the circulator 30 includes a Venturi device 32 (best seen in FIG. 2) in the form of a pipe 34 having a constriction or throat at 36 with gradually enlarging conical passages 38, 40 extending upwardly and downwardly from the centrally disposed throat 36. As is generally well known, as far as Venturi nozzles are concerned, the pressure, owing to the faster gas flow at the throat 36, provides a region of reduced pressure.

Connected between the lower casing 14 and the throat 36 is a tube or line 42 having therein a purge valve 44; as its name implies, the purpose of the valve 44 is to clear the system of whatever gas exists in the lower cavity 46 after a test has been completed. Leading upwardly from the enlarged end of the passage 38 of the Venturi device 32 is a tube or line 48 that communicates with the cavity 46. Extending downwardly from the lower enlarged end 40 is another tube or line 50, this tube communicating with the interior of an elongated absorption cell 52 having infrared transmitting windows 54, 56 at opposite ends thereof.

The cell 52 is an important part of an infrared gas analyzer denoted generally by the reference numeral 60 which also includes a source 62 of infrared energy at one end thereof. The source 62 provides a beam of radiant energy that passes completely through the elongated cell 52 and then through an interference filter 64 which is selected so as to transmit a narrow band of radiation centered near 3.4 $\mu$m, this being the wavelength at which the selected gas, butane, has its greatest attenuation. Inasmuch as the method herein described can be adapted to sense any gas having an absorption-spectra in the near infrared, the particular filter 64 will be selected in accordance with the absorption properties of the gas that is employed. Stated somewhat differently, the absorption constituent is what determines the selection of the particular filter 64. The analyzer 60 also includes a photoelectric cell 66 onto which the radiant beam impinges after passing through the filter 66. Although perhaps not yet readily appreciated, the output from the photocell 66 constitutes a fluctuating or alternating current signal and is impressed upon the input of an alternating current amplifier 68. The AC amplified output from the amplifier 68 is delivered to an output rectifier 70 which furnishes a variable direct current signal to operate a strip-chart recorder 72.

At this time attention is directed to the use of a tube or line 74 leading downwardly to a flexible metal bellows 76. Articulated linkage 78 actuated by a motor-driven crank wheel or disc 80 causes the bellows 76 to be repeatedly compressed and expanded. As will become clearer hereinafter, such repeated compression of the bellows 76 will cause the infrared beam to be modulated by reason of the resulting pulsating pressure when butane is present.

OPERATION

Having presented the foregoing description, the manner in which my apparatus functions should be fairly apparent; however, a detailed operation sequence will certainly be of help in fully appreciating the various advantages to be derived therefrom.

The preliminary step to be taken is to clamp the plastic film 10 in the diffusion cell 11. Although the clamping mechanism is not depicted, such action causes the two gaskets 16 to compressively act against the test material 10.

The next step is to fill the upper cavity 18 with the butane gas. Therefore, the valve 22 is opened so as to enable the butane to flow into the cavity 18, displacing whatever air is there. The valve 28 remains open during the entire test, thereby assuring continuous surface contact of the gas with the material 10.

Under these conditions, it is not essential that the purge valve 44 be opened to atmosphere inasmuch as any test gas from a preceding test would already have escaped. However, sometimes, in order to repeat given test, the opening of the purge valve 44 will enable the cavity 46 to be filled with air (or at least a gas having dissimilar attenuating properties from the test gas, butane in the exemplary instance) without having to unclamp the diffusion cell 11.

At any rate, it should now be recognized that the test gradient has been established with the film 10 being exposed to 100 percent butane at atmospheric pressure on its upper side, yet subjected to butane-free air which also is preferably at atmospheric pressure, at its lower side. Under the influence of the driving force supplied by the butane partial pressure gradient, butane molecules will begin to diffuse from the cavity 18 through the plastic film 10 into the lower cavity 46, assuming that the test material 10 is at least somewhat permeable to the particular test gas (butane in this instance). Since the only path from the upper cavity 18 to the lower cavity 46 is through the film 10, any butane collected in the lower cavity 46 will be indicative of the gas transmission characteristics of the film 10.

It will be seen that the butane that does diffuse through the film 10 will disperse relatively uniformly throughout the total "capture volume" defined by the cavity 46 plus the various tubes 42, 48, 50 and 74, the Venturi device 32, the bellows 76, as well as the absorption cell 52. As the vapor diffuses through the film, its concentration in the lower "capture volume" increases with time as it accumulates.

To hasten the dispersion of any butane gas that has diffused through the test film 10, the Venturi device 32 functions to circulate the gas in a closed loop represented by the sequence of arrows labeled 90. This is achieved by the motoractuated bellows 76 being repeatedly compressed to cause gaseous flow in the direction of the double-headed arrow 92. Owing to the region of reduced pressure at the throat 36, the low pressure at this site acts to draw air into the Venturi device 32 through the tube 42 from the lower cavity 46. This causes a more rapid dispersion of the butane that may have diffused through the film 10, the rapid mixing thereof circulating around the loop indicated by the sequential arrows 90. It will be recognized that the reduced pressure exists whether the gas is being forced upwardly or downwardly as indicated by the double-headed arrow 92. Because of the continuous agitation provided by the pulsations derived from the bellows 76 that is being repeatedly collapsed and expanded, the butane that has passed through the film 10 is distributed to all parts of the "capture volume" which, as already indicated, includes the bellows 76, the absorption cell 52, the Venturi device 32, the cavity 46 and the interconnecting tubing.

The cyclic compressing of the bellows 76 will correspondingly compress whatever butane is present in the lower portion of the system. When the butane is compressed, it becomes less transparent, that is it absorbs more radiant energy than when not compressed, and when the pressure is relaxed or decreased, then more energy passes with less energy being absorbed in the cell 52 of the analyzer 60. Use is made of this pressure effect to produce a very detectable modulation of the infrared beam passing through the cell 52. It will be understood that the motor-driven bellows 76 produces pressure pulsations sufficiently pronounced to enable detection by the photocell 66. Since the amplifier 68 is an AC one, only the fluctuating signal will be amplified.

If the motor-driven wheel or disc 80 is rotated at 1,800 rpm, the pulsation frequency is 30 hz. Not only are the pressure pulsations used to modulate the beam passing through the cell 52, but, as already pointed out, the Venturi action circulates gas from the lower cavity 46 around the closed loop represented by the arrows 90 that is part of the total "capture volume." Due to the relatively narrow or constricted throat 36, the relatively large pressure pulsations found in the absorption cell 52 and bellows 76 are not transmitted to the diffusion cell 12 and therefore do not adversely affect the transmission of butane downwardly through the film 10.

If no butane has passed downwardly through the film 10, then there is really no test gas within the "capture volume," more particularly, within the absorption cell 52. Consequently, under these conditions, the pressure pulsations in the absorption cell 52 will not produce any modulation of the radiant energy through the cell 52 and the photocell 66 will experience only a reception of a constant level of radiation; therefore, there will be no alternating current signal delivered from the photocell 66 to the alternating current amplifier 68. Since there is no output signal from the amplifier 68, because there is no fluctuating input, the rectifier 70 will not forward a direct current signal, because it receives nothing from the amplifier 68, and the recorder 72 will read "zero."

On the other hand, assuming that there has been a transmission of butane downwardly through the film 10 and a dispersion thereof from the lower cavity 46 throughout the system, then the amount of butane within the absorbing cell 52 will absorb a fraction of the radiant energy from the source 62. This will cause a reduced amount of energy to impinge on the photocell 66. Furthermore, this absorption will vary as the pulsating pressure varies, so that the energy incident upon the photocell 66 will for all intents and purposes flicker. As can be readily understood, the resulting AC signal will be the same frequency as the pressure pulsations and its amplitude will be a function of the concentration of butane gas in the cell 52 and therefore an indication of the amount transmitted through the plastic film 10.

With the marker or pen 72a of the recorder 72 moving horizontally in FIG. 1 in accordance with the output signal from the rectifier 70, and the chart 72b moving vertically on a time basis, it follows that the operator may measure the slope of the curve 72c traced on the recorder's chart 72b to determine the transmission rate of butane through the film 10. However, concentration data can be read in other ways that do not require an analog recorder, such as the strip-chart recorder 72. It is possible, for example, to relate transmission rates to the time required for a specific incremental increase in concentration to occur. Thus, the gas transmission rate is basically inversely proportional to time and a determination of the amount of butane collected in the cavity 46 during a prescribed period of time will be representative of the gas transmission rate of the film 10 or other test barrier.

Also, it should be appreciated that while my method and apparatus will be of greatest value in determining the transmission rate, it can also serve to detect any passage of gas through the film or other barrier undergoing test. In this regard, all that need be done is to determine that there is indeed an output signal from the rectifier 70. If there is no such signal, then no butane, or whatever test gas or vapor is introduced into the upper cavity 18, has passed downwardly through the film 10 or other test barrier into the lower cavity 46. Without any test gas in the absorption cell 52, then there is no modulated signal picked up by the photocell 66 and hence there is no signal to be amplified and rectified. However, when there has been a leakage through the film 10, then even though the amount is rather minimal, there will be produced an output signal from the rectifier 70 which, without determining the magnitude thereof, indicates that some gas has passed. Usually, though, a test is quantitatively conducted, which involves both amount and time as described above.

I claim:

1. A method of detecting the passage of gas through a barrier comprising the steps of subjecting one side of the barrier to a gas, repeatedly compressing at least a portion of any gas that has passed through said barrier, transmitting radiant energy through said repeatedly compressed portion of gas, and determining the presence of any modulation of the radiant energy transmitted through said repeatedly compressed portion of gas, whereby the presence of any such modulation is indicative of gas passage through the barrier when said gas possesses the capability of absorbing at least some of said radiant energy.

2. The method of claim 1 in which said gas absorbs infrared energy, and said radiant energy is within the infrared spectrum.

3. The method of claim 2 in which said gas absorbs infrared energy having a certain wavelength, the method including the step of filtering out energy transmitted through said repeatedly compressed portion of gas having a wavelength outside of a narrow band containing said certain wavelength therein.

4. The method of claim 3 including the step of producing a time curve in accordance with the amount of modulated energy existing after completion of said filtering step, whereby said curve is indicative of the permeability of said barrier.

5. A method of detecting the passage of a gas through a barrier comprising the steps of subjecting one side of a portion of the barrier to be tested with a gas capable of absorbing radiant energy having a certain wavelength, collecting at least a portion of any of the gas that has passed through the barrier to the other side thereof, directing at least a portion of any collected gas between a source of radiant energy and a filter capable of transmitting a band of radiation centered near said wavelength, sensing the radiant energy transmitted through said filter, the amount of sensed radiant energy being indicative of the amount of collected gas and hence indicative of the amount of gas that has passed through said barrier, and periodically compressing said gas as it passes between said source of radiant energy and said filter, whereby any gas that does not absorb radiant energy at said certain wavelength has the radiant energy transmitted therethrough attenuated by said filter and any radiant energy transmitted through said filter fluctuates at the rate that said gas is compressed.

6. A method of detecting the passage of a gas through a sheet of material that might be gas permeable comprising the steps of continuously subjecting for a given period one side of a portion of said sheet to be tested with a gas capable of absorbing radiant energy having a particular wavelength, collecting at the other side of said sheet at least a portion of any gas that has passed through the sheet, inducing pressure pulsations in the gas that has passed through said sheet, subjecting said pulsating gas to radiant energy, and detecting the amount of radiant energy transmitted through said collected gas, the amount of radiant energy transmitted through said collected gas being indicative of the amount of collected gas and hence indicative of the amount of gas that has passed through said sheet during said given period.

7. Apparatus for detecting the passage of gas through a barrier comprising means for holding the barrier, means for supplying gas to one side of the barrier, means for repeatedly compressing at least a portion of any gas that has passed through said barrier, means for transmitting radiant energy through said gas portion while it is being repeatedly compressed, and means for determining whether the transmitted energy is pressure modulated.

8. The apparatus of claim 7 in which said holding means includes a diffusion cell having first and second cavities, said barrier being between said cavities, said supplying means supplying gas to said first cavity and said second cavity collecting any gas passing through said barrier, said apparatus including means for withdrawing from said second cavity at least a portion of any gas collected therein so that it can be repeatedly compressed by said compressing means.

9. The apparatus of claim 8 in which said withdrawing means includes a Venturi device.

10. The apparatus of claim 9 in which said Venturi device includes first and second tapered passages and a constricted throat therebetween, said first passage and said throat being connected to said second cavity and said second passage being connected to said radiant energy transmitting means.

11. The apparatus of claim 10 in which said radiant energy transmitting means includes an elongated absorption cell, said second passage being connected nearer one end of said absorption cell, and said compressing means being connected nearer the other end thereof.

12. The apparatus of claim 11 in which said compressing means includes a bellows.

13. The apparatus of claim 11 in which said determining means includes an interference filter and photocell.

14. The apparatus of claim 13 in which said determining means also includes an alternating current amplifier and rectifier.

15. The apparatus of claim 14 in which said determining means additionally includes a chart recorder for providing a curve in accordance with time and the output signal from said rectifier, whereby said curve is representative of the permeability of the barrier.

16. Apparatus for detecting the passage of gas through a barrier comprising a diffusion cell for holding the barrier to be tested and thereby form first and second cavities to either side of the barrier, means for introducing into said first cavity a gas having the ability to attenuate infrared energy at a certain wavelength, means for withdrawing at least some of the gas from said second cavity that has passed through said barrier from said first cavity, means for repeatedly compressing at least some of the gas withdrawn from said second cavity, means for passing radiant energy through the repeatedly compressed gas to provide a pressure modulated beam of radiant energy, means for filtering said modulated energy to attenuate radiant energy other than that in a narrow band containing said certain wavelength, and means for sensing the modulated radiant energy transmitted through said filter means.

17. Apparatus for detecting the passage of gas through a barrier comprising a diffusion cell for holding the barrier, means for introducing a gas into said cell at one side of said barrier, pulsating pump means for withdrawing at least some of any gas from said cell that has passed through said barrier, means for transmitting infrared energy through at least some of the withdrawn gas to provide a pressure modulated infrared beam if said gas absorbs some of said infrared energy, and means for providing an output signal only when the absorption is of a certain wavelength.

18. Apparatus for detecting the passage of gas through a barrier comprising a diffusion cell for holding the barrier, means for supplying gas to said cell at one side of said barrier, means for repeatedly compressing at least a portion of any gas that has passed through said barrier, means for transmitting radiant energy through said repeatedly compressed portion of gas, and means for receiving radiant energy that has passed through said repeatedly compressed portion of gas, whereby the received radiant energy will be modulated in accordance with the absorptive properties of the gas supplied to said diffusion cell by said supplying means.

* * * * *